United States Patent [19]
Vandamme et al.

[11] Patent Number: 5,301,210
[45] Date of Patent: Apr. 5, 1994

[54] COHERENT DEMODULATING DEVICE WITH CARRIER WAVE RECOVERING DIGITAL CIRCUIT

[75] Inventors: Patrick Vandamme, Perros Guirec; Joëlle Kervarec, Pleumeur Bodou; Alain Leclert, Ploulec'h, all of France

[73] Assignee: France Telecom, France

[21] Appl. No.: 937,279

[22] Filed: Aug. 31, 1992

[30] Foreign Application Priority Data

Aug. 30, 1991 [FR] France ................... 91 10760

[51] Int. Cl.$^5$ .................. H04L 27/22; H03D 1/00
[52] U.S. Cl. ...................... 375/83; 375/88; 375/119; 329/304; 329/306
[58] Field of Search .......... 375/39, 42, 46, 52, 375/54, 80, 83, 85-89, 118-119; 329/304, 306, 345-346, 360-361; 332/103, 145

[56] References Cited

U.S. PATENT DOCUMENTS

| | | | |
|---|---|---|---|
| 4,859,956 | 8/1989 | Mizoguchi | 329/304 |
| 4,959,619 | 9/1990 | Delacroix et al. | 329/306 |
| 5,001,727 | 3/1991 | McDavid | 375/80 |
| 5,025,455 | 6/1991 | Nguyen | 329/304 |
| 5,170,415 | 12/1992 | Yoshida et al. | 329/304 |

FOREIGN PATENT DOCUMENTS

0071514 2/1983 European Pat. Off. .
2552959 4/1985 France .

OTHER PUBLICATIONS

*Phaselock Techniques* by Floyd M. Gardner, Ph.D., John Wiley & Sons, Inc., 1966, pp. 8-23.

*Primary Examiner*—Stephen Chin
*Assistant Examiner*—Young Tse
*Attorney, Agent, or Firm*—Laubscher & Laubscher

[57] ABSTRACT

A coherent demodulating device is characterized by a demodulating circuit and a carrier recovering circuit produced entirely in digital form. Two quadrature demodulation carrier waves produced by a local oscillator are mixed with a demodulation carrier signal modulated by symbols to produce analog signals. The analog signals are digitized by sampling at symbol reception frequency into incoming digital signals. A digital phase shifter phase shifts the incoming signals by a demodulation phase derived by a phase loop digital processing circuit as from error signal pulses supplied by a comparing circuit receiving outgoing digital signals from the phase shifter. The compensation for the phase and frequency differences between the demodulation and modulation carrier waves is carried out a posteriori in digital form by phase shifting the incoming signals.

6 Claims, 7 Drawing Sheets

16-QAM MODULATION

COHERENT DEMODULATING DEVICE WITH CARRIER WAVE RECOVERING DIGITAL CIRCUIT

BACKGROUND OF THE INVENTION

1. Field of the Invention

The present invention relates to a coherent demodulating device and more especially means for recovering a carrier wave in the modulated signal that the demodulating device receives.

The demodulating device is included in a receiver of a digital transmission system, e.g. for digital communications between microwave relay stations and/or by satellite.

2. Description of the Prior Art

In a transmitter of a transmission system, a data digital signal modulates a radio carrier. The modulation employed can be a multi-phase modulation or a multi-amplitude modulation. Multi-phase modulation is a phase modulation with N states or symbols, where N is an integer equal to a power of 2; e.g. when N is equal to 4, 8 or 16, the phase modulation is designated by the abbreviation 4-PM, 8-PM, or 16-PM. The multi-amplitude modulation is known under the initials QAM, meaning "quadrature amplitude modulation" and combines two quadrature carriers modulated respectively, e.g. to 2, 4 or 8 amplitude states or levels; thus a multi-amplitude modulation offers, e.g. 4, 16 or 64 states or symbols corresponding to the initials 4-QAM, 16-QAM, 64-QAM.

Thus whatever the modulation employed, this makes use of a modulation by two component signals, derived from the digital signal to be modulated, modulating two phase quadrature waves derived from the same carrier wave. The carrier frequency is greater than the transmission frequency of the symbols, also referred to as clock frequency 1/T, T being the clock period. The modulated digital signal is generally transposed to the transmission frequency in the transmitter of the transmission system. In the receiver, frequency-transposing and preamplifying means receive the transmitted signal and apply the intermediate-frequency multi-symbol modulated signal to the demodulating device.

The two parameters necessary to restore the digital signal transmitted by a transmitter are the phase and frequency of the carrier wave.

The known carrier recovering circuits use phase servoing techniques. These circuits are obtained in the shape of an analog phase locked loop (PLL) including a phase comparator, a filter and a voltage-controlled oscillator. The drawbacks involved in these embodiments are numerous. From the point of view of performances, the compensation for a frequency difference between the demodulation carrier wave frequency supplied by the voltage-controlled oscillator and the frequency of the modulation carrier wave in the transmitter is only accomplished as counterpart to a phase error proportional to the frequency difference between the carrier waves and inversely proportional to the loop gain. As the phase error has quite considerable consequences on the performances of the transmission system, it should be limited to low values, typically a few tenths of a degree, which requires increasing the loop gain. It is however impossible to increase this gain arbitrarily, on grounds of loop stability.

Another consequence induced by this phase error is the limitation of the acquisition frequential range to frequency values compatible with an acceptable static phase error.

From the point of view of the use of such a phase loop, exacting adjustements are necessary in order to obtain the required performances. Moreover a modification to one of the loop parameters or transmission system parameters, such as modulation speed, requires a complete redefinition of the whole loop.

OBJECTS OF THE INVENTION

The main object of the invention is to obviate the disadvantages of known analog phase loops.

Another object of this invention is to provide carrier wave recovering means which are fully designed in the shape of digital circuits.

A further object of this invention is to provide carrier wave recovering means which firstly is more easy to integrate, and secondly possesses operating characteristics independent of the modulation speed of the received signal.

SUMMARY OF THE INVENTION

Accordingly, there is provided a coherent demodulation device included in a receiver receiving a modulated signal obtained by multi-symbol modulation of two modulation carrier waves in quadrature. The device comprises demodulating means supplying quadrature demodulation carrier waves for demodulating the modulated signal into two demodulated analog component signals, said quadrature demodulation carrier waves having a frequency belonging to a frequential uncertainty range of the modulation carrier waves, sampling means operating at symbol clock frequency of the modulated signal for converting the two demodulated analog component signals into two incoming digital signals forming couples of samples, digital phase shifting means for phase shifting the incoming signals by a digital demodulation phase into two outgoing digital signals, digital generalized comparing means receiving the two outgoing digital signals for producing error signal pulses, and digital processing means for calculating the digital demodulation phase as a function of the error signal pulses so as to a posteriori compensate for phase and frequency differences between the modulation carrier waves and the demodulation carrier waves by phase shifting the incoming signals.

The demodulating device only comprises, as analog circuits, demodulating means with mixers and oscillator for demodulating the received modulated signal by two quadrature demodulation carrier waves. The oscillator in the demodulating means is a free oscillator, and not a voltage-controlled oscillator. This facilitates integration of the device and obtains better characteristics.

The phase loop basically obtained by the phase shifting means, the generalized comparing means and processing means is fully digital. As this phase loop operates at the modulation frequency, it can be used for clock frequencies of several tens of MHz with conventional technologies.

According to a feature of the invention, the generalized comparing digital means make a distinction between the phase tracking operation (or "frequency holding") during which a phase comparison between modulation carrier waves and demodulation carrier waves is made and the frequency acquisition operation during which a frequency comparison between the carrier waves is made. Preferably the generalized comparing means comprises digital phase comparing means for producing, at the symbol clock frequency, first and second error signal pulses respectively in response to negative and positive phase differences between the demodulation carrier waves and modulation carrier waves, digital frequency comparing means for producing, at the symbol clock frequency, third and fourth error signal pulses respectively in response to positive and negative frequency differences between the demodulation carrier waves and modulation carrier waves, and state detecting means for supplying detection pulses responsive to amplitudes of said outgoing digital signals lying in respective predetermined amplitude intervals during each period of the symbol deriving clock frequency, thereby deriving a logic control signal to activate the frequency comparing means and deactivate the phase comparing means when a count of the detection pulses cumulated during a period multiple of the symbol clock period is greater than a first predetermined threshold, and to deactivate the phase comparing means and activate the phase comparing means when the count of the detection pulses cumulated during the multiple period is less than the first threshold.

The state detecting means which contributes to distinguishing between the two operations preferentially comprises a circuit for producing one of the detection pulses when said amplitudes of the outgoing signals lie in the respective predetermined intervals during the clock period, a counter for counting the detection pulses during the multiple period into a cumulated pulse count, a comparator for comparing the cumulated detection pulse count in the counter with the first threshold thereby deriving the logic control signal whose two states respectively represent detection pulse counts greater than and less than the first threshold, and switching means for switching error signal pulses outgoing from the phase comparing means and frequency comparing means to inputs of the digital processing means as a function of the states of the logic control signal respectively.

According to another feature of the invention, the digital processing means comprises an a up-down counter having an incrementable and decrementable content. The content is incremented and decremented respectively by first and second error signal pulses produced by the digital generalized comparing means when said detection pulse count cumulated in said counter during the multiple period is less than the first threshold. The content in the up-down counter is also incremented and decremented respectively by the third and fourth error signal pulses produced by the generalized comparing means when said cumulative detection pulse count cumulated in said counter during said multiple period is less than said first threshold. The digital processing means further comprises adding and substracting means for respectively adding the content of the up-down counter to a first predetermined parameter in response to one of the first and third pulses and for substracting the content of the up-down counter from the first parameter in response to one of the second and fourth pulses thereby providing an addition-subtraction result, means for multiplying the addition-subtraction result by a second predetermined parameter into a product, and means for accumulating the product at the symbol clock frequency thereby supplying the demodulation phase.

The up-down counter makes a first error signal integration in a similar way to a loop filter, and the accumulating means carry out a second error signal integration, in a similar way to a voltage-operated oscillator. This double integration obtains a null phase static error, whatever the frequency difference to be compensated between the modulation and demodulation carrier waves.

The demodulating device can also comprise means for periodically saving the content of the up-down counter into a saved content when the detection pulse count cumulated in the counter during the multiple period is less than the first threshold, and means for introducing the saved content into the up-down counter when the detection pulse count cumulated in the counter during the multiple period is greater than the first threshold.

The saving means contributes to obtaining a frequency acquisition range similar to the theoretical maximum range, with very short acquisition durations.

BRIEF DESCRIPTION OF THE DRAWINGS

Further features and advantages of the invention will be more clearly apparent on reading the following description of several embodiments of this invention as illustrated in the corresponding accompanying drawings in which.

DESCRIPTION OF THE PREFERRED EMBODIMENTS

Figure 1A:
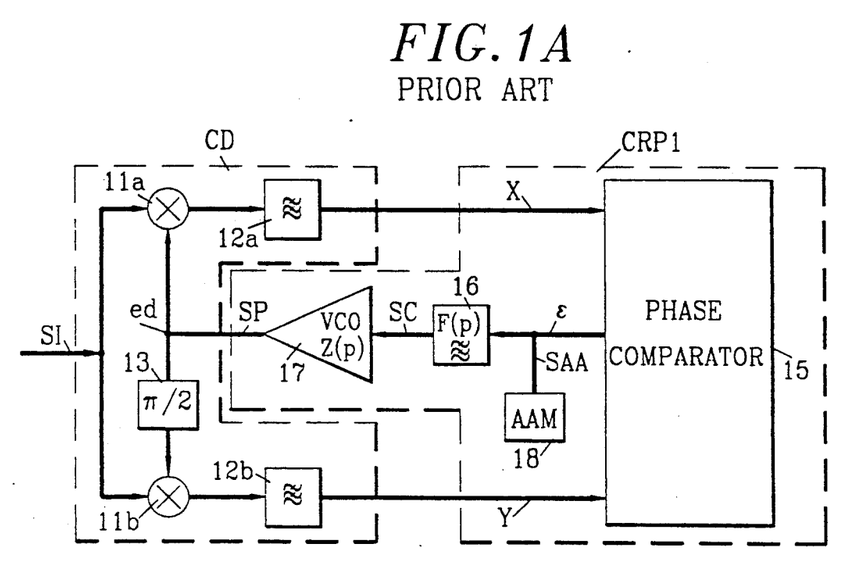
FIG. 1A is block diagram of a coherent demodulating device according to the prior art.

Referring to FIG. 1A, a coherent demodulating device included in a receiver of a digital transmission system according to the prior art comprises a demodulating circuit CD and a carrier recovering circuit CRP1. The coherent demodulating device receives a modulated signal SI with modulation carrier wave, transmitted by a transmitter of a digital transmission system.

The demodulating circuit CD comprises two mixers $11a$ and $11b$ acting as demodulators, two low-pass filters $12a$ and $12b$, and a ($\pi/2$) phase shifter 13. The carrier recovering circuit CRP1 comprises a phase comparator 15, a loop low-pass filter 16 and a voltage-controlled oscillator (VCO) 17, and may include, according to certain embodiments known to those skilled in the art, a frequency acquisition aiding means (AAM) 18 connected to the input of loop filter 16.

Two first respective inputs of mixers 11a and 11b receive the modulated signal SI. A recovered carrier signal SP is applied to second inputs of mixers 11a and 11b directly and through ($\pi/2$) phase shifter 13 respectively. Respective outputs of the mixers are connected to inputs of comparator 15 through filters 12a and 12b. Filters 12a and 12b reject the harmonic components in the vicinity of the frequency double of the carrier frequency in the demodulated signals delivered by the mixers. Phase comparator 15 produces an error signal $\epsilon$ representative of the timeaneous phase error between the recovered modulation carrier signal SP and the modulation carrier wave transmitted to be estimated. Oscillator 17 produces the recovered carrier signal SP servoed to the frequency and phase of the modulation carrier wave in response to the error signal $\epsilon$ generated at the output of phase comparator 15 and applied to a control input of oscillator 17 through loop filter 16.

The task of loop filter 16 consists in limiting the influence of the noise on the error signal $\epsilon$ and rejecting high frequency components so as to servo oscillator 17 correctly.

Signals X and Y in base band issued from respective filters 12a and 12b correspond to the two component signals modulating the two quadrature carrier waves in the transmitter. These two signals are applied to a regenerator, not shown, which firstly discriminates the states in the demodulated signals, and secondly, compares the states to thresholds to decode the symbols so as to reconstitute the digital information initially transmitted. The sampling times in the regenerator are derived by a clock regeneration circuit, e.g. as from baseband signals X and Y.

Figure 1B:
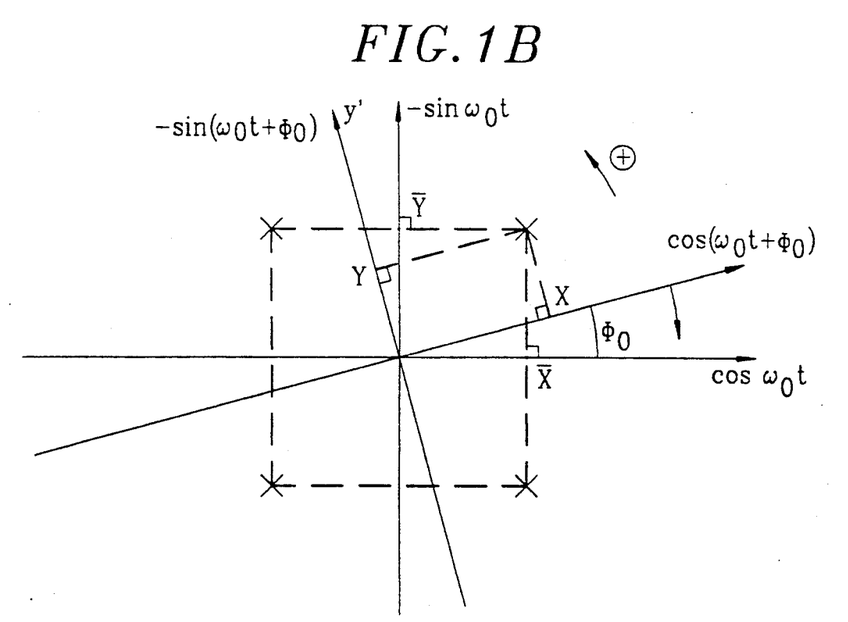
FIG. 1B is a Fresnel diagram to illustrate the principle of coherent demodulation.

FIG. 1B shows for example, in the form of a Fresnel diagram, a four-state phase modulation (4-PM). The four symbol crosses shown on the diagram are the geometrical points of a vector $\overline{OM}$ associated to the modulated signal. Demodulation consists in "projecting" the modulated signal SI on the two demodulation carrier waves and to do so, it is firstly necessary to recover the phase of one of the carrier waves. This is carried out by comparator 15 which produces the error signal $\epsilon$ to servo the phase $\phi_o$ of the recovered carrier signal $SP=\cos(\omega_o t+\phi_o))$ respectively applied to the two second inputs of the mixers directly and through phase shifter 13, to the phase of the carrier wave to be estimated and recovered, here $\cos\omega_o t$. Error signal $\epsilon$ representative of the phase shift $\phi_o$ is derived from the baseband components (X, Y) of the demodulated signal and components $(\overline{X},\overline{Y})$ of a signal reconstructed precisely from the components of the demodulated signal.

Phase comparator 15 is replaced in certain embodiments by a phase/frequency comparator to obtain firstly the carrier frequency, notably when this varies within a broad range, then the phase of the carrier wave. Nevertheless in the case in which only the phase comparator 15 is used, the acquisition aiding means 18 is then employed for frequency acquisition. The means 18 supplies a signal SAA which scans the nominal frequency of servoed oscillator 17 in the frequential uncertainty range of the quadrature carrier waves transmitted in the signal received. The signal SAA is inhibited as soon as frequency acquisition takes place. Device 18 notably provides for a considerable increase in the acquisition frequential range.

The drawbacks of such a circuit, according to the prior art have been listed in the description of the prior art.

We are now describing the coherent demodulating device embodying the invention for digitally modulated signals, including a digital carrier recovering circuit.

Referring to FIG. 1A, the error signal $\epsilon$ produced by comparator 15 is applied to the demodulation input ed through filter 16 and voltage-controlled oscillator 17 in series. Filter 16 offers a modelized impedance written in the shape of a Laplace transform:

$$F(p)=(1+\tau_2 p)/\tau_1 p.$$

$\tau_1$ and $\tau_2$ are constants deduced from the features of filter 16.

Likewise voltage-controlled oscillator 17 offers a modelized impedance written in the shape of a Laplace transform:

$$Z(p)=K_o/p,$$

where $K_o$ is the gain of oscillator 17.

The recovered carrier signal SP therefore possesses a phase $\phi$ to demodulate the received signal SI, written in the shape of a Laplace transform:

$$\phi(p)=(K_o/p)\cdot[(1+\tau_2 p)/(\tau_1 p)]\cdot\epsilon(p),$$

i.e, $$\phi(p)=[K_o\cdot\tau_2/(\tau_1\cdot p)+K_o/(\tau_1\cdot p^2)]\cdot\epsilon(p) \tag{1}$$

The mathematical grounds behind the present invention lie in the use of the above equation (1) in discrete form. It is thus possible to obtain a "digital" phase loop for carrier recovering circuit designed as from digital and not analog electronic components such as filter and voltage-controlled oscillator.

The equation in discrete form deduced from the equation (1) is written:

$$\phi_{m+1}=\phi_m+K_o T(T/\tau_1)((\tau_2/T)\cdot\epsilon_m+W_m) \tag{2a}$$

with $W_m=W_{m-1}+\epsilon_{m-1}$

T designates the sampling period or clock period corresponding to the period of the symbols in the demodulated signals, $\phi_m$ designates the demodulation phase at a sampling time $t=mT$, and $W_m$ is an intermediate variable.

Figure 3:
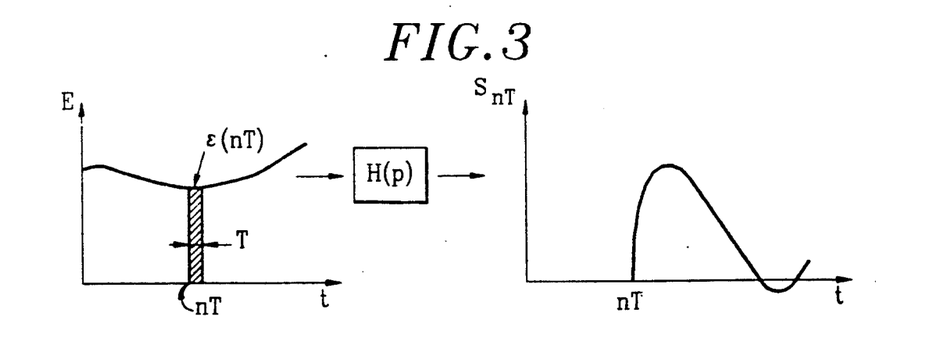
FIG. 3 shows a pulse response diagram for discrete shaping the operating equation of a phase loop.

From the pulse response diagram shown in FIG. 3, it is possible to get a better grasp of the discrete formatting of equation (1). A response Snt is associated to a pulse $\epsilon(nT)$ on the input of a system with transmittance H(p). Thus at each time $t=nT$, the signal $S_{nt}(t)$ supplied from the system in response to the signal $\epsilon(t)$ is approximated by the sum of the partial responses relating to the n pulses applied between $t=O$ and $t=nT$, i.e., $$S_{nt}(t) = \sum_{k=0}^{n} T\cdot\epsilon(kT)\cdot H(t-kT)$$

in which H(t) is the response of the system to the Dirac pulse.

The discrete formatting of the equation (1) is deduced for example from the aforesaid results.

The terms $K_o T(T/\tau_1)$ and $(\tau_2/T)$ in equation (2a) can be written:

$$K_o^T(T/\tau_1) = \frac{1}{K_d} \cdot \frac{4\xi^2(B_L \cdot T)^2}{(\xi^2 + 1/4)^2}$$

$$\frac{\tau_2}{T} = \frac{\xi^2 + 1/4}{B_L \cdot T}$$

by using the relations indicating the characteristic parameters of a phase locked loop $$\omega_n = (K_o K_d/\tau_1)^{\frac{1}{2}}$$

$$\xi = (\tau_2/2) \cdot \omega_n$$

$$B_L = W_n(\xi + \tfrac{1}{4})/(2\xi)$$

in which $\omega_n$ and $K_o$ respectively designate the natural frequency and the gain of oscillator 17, $K_d$ the gain of comparator 15 in the loop, and $\xi$ the damping factor of the loop and $B_L$ its noise bandwith. These relations are for example disclosed in Gardner's book, entitled "Phaselock Techniques", John Wiley & Sons, Inc., (1966), New York, particulary pages 8 to 22.

The equation (2a) is thus written in the form:

$$\phi_{m+1} = \phi_m + \frac{1}{K_d} \cdot \frac{4\xi^2(B_L \cdot T)^2}{(\xi^2 + 1/4)^2} \cdot$$

$$\left( \frac{\xi^2 + 1/4}{B_L \cdot T} \cdot \epsilon_m + W_m \right) \text{with } W_m = W_{m-1} + \epsilon_{m-1}$$

By setting $$\text{ADD} = \frac{\xi^2 + 1/4}{B_L \cdot T} \text{ and MUL} = \frac{1}{K_d} \cdot \frac{4\xi^2(B_L \cdot T)^2}{(\xi^2 + 1/4)^2},$$

equation 2(a) is written as:

$$\phi_{m+1} = \phi_m + MUL(\text{ADD} \cdot \epsilon_m + W_m) \tag{2b}$$

Figure 2:
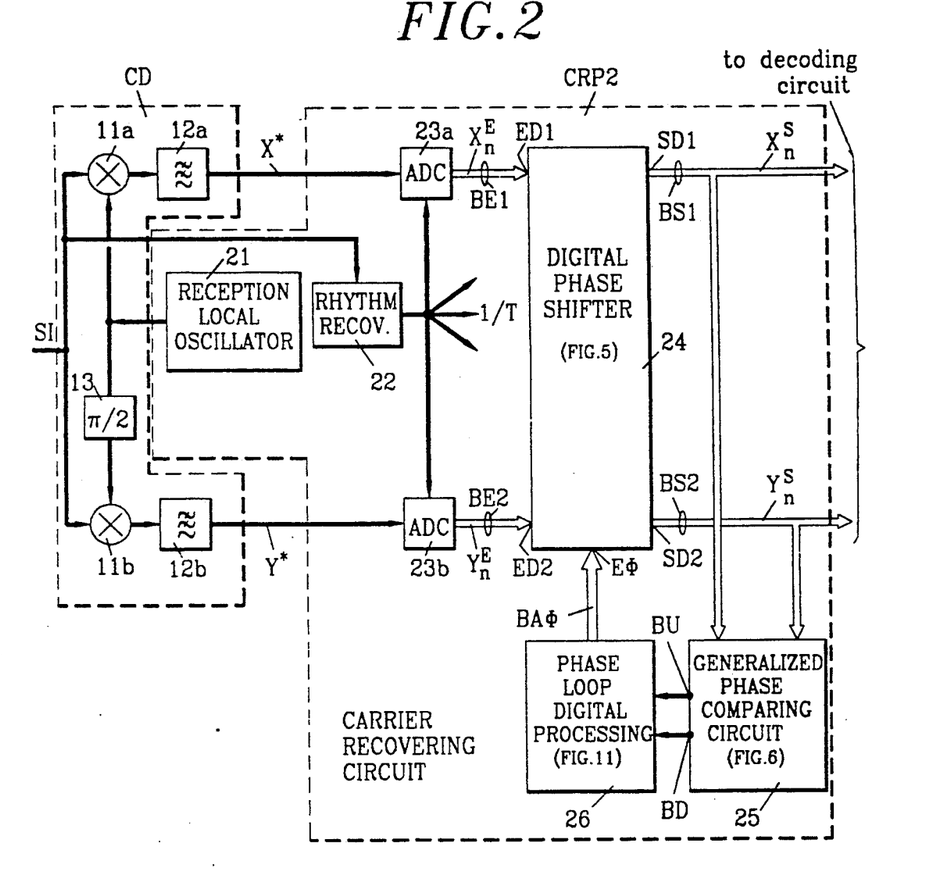
FIG. 2 is a block diagram of a digital coherent demodulating device embodying the invention.

Referring to FIG. 2, a coherent demodulating device embodying the invention comprises the demodulating circuit CD and a carrier recovering circuit CRP2.

Demodulating circuit CD comprises the two mixers 11a and 11b the two filters 12a and 12b and $(\pi/2)$ phase shifter 13 which are disposed in the same way as in FIG. 1. The intermediate frequency modulated signal SI is applied to the two first respective inputs of the two mixers. It will be observed that a modulated signal having a carrier with a nominal frequency equal to the transmission frequency can also be applied to the first inputs of the mixers where the received signal is not previously transposed to an intermediate frequency.

The carrier recovering circuit CRP2 comprises a reception local oscillator 21, a rhythm recovering circuit 22, two analog-to-digital converters 23a and 23b, a digital phase shifter 24, a generalized phase comparing circuit 25 and a phase loop digital processing circuit 26. The local oscillator replaces oscillator 17 in FIG. 1 and thus has an output which is connected to the second inputs of mixers 11a and 11b, directly and through phase shifter 13. Local oscillator 21 supplies a sinewave signal whose frequency belongs to a frequential uncertainty range of the quadrature transmission carrier waves. The rhythm recovering circuit 22 receives the modulated signal SI and produces a sampling signal at a frequency 1/T equal to the transmission frequency of the modulating symbols. The sampling signal is applied to sampling clock inputs of analog-to-digital converters 23a and 23b.

Analog-to-digital converters 23a and 23b digitalize two intermediate signals X* and Y* derived from filters 12a and 12b of demodulating circuit CD at sampling frequency 1/T supplied by the rhythm recovering circuit 22. The two analog-to-digital converters supply digitalized signals to parallel data inputs ED1 and ED2 of digital phase shifter 24 via two input buses BE1 and BE2. The digitalized signals carry couples of incoming sampling signals, such as $X_n^E$ and $Y_n^E$, resulting from the sampling of analog intermediate signals X* and Y* at a time t=nT.

Digital phase shifter 24, generalized phase comparing circuit 25 and phase loop digital processing circuit 26 constitute a "digital" phase loop. Parallel data outputs SD1 and SD2 of digital phase shifter 24 are connected to inputs of comparing circuit 25 by means of two respective output buses BS1 and BS2. Two output terminals BU and BD of comparating circuit 25 are connected to two inputs of digital processing circuit 26 whose output is in the form of an address bus BA$\phi$ connected to phase shifting inputs E$\phi$ of digital phase shifter 24.

The general operation of the device embodying the invention shown in FIG. 2 is now described, before explaining the detailed operation of the circuits included in the carrier recovering circuit CRP2.

Reception local oscillator 21 whose frequency precision is preferably ensured by a quartz, supplies, as already indicated, a sinewave signal at a frequency belonging to the frequential uncertainty range of the quadrature transmission carrier waves. The received signal SI is written in the form:

$$SI = ai\cos(\omega_o t) - bi\sin(\omega_o t)$$

where (ai, bi) denotes a sequence of symbols depending on the adopted multi-symbol modulation and $(\cos(\omega_o t), \sin(\omega_o t))$ denotes the couple of quadrature carrier waves.

On the outputs of filters 12a and 12b, the intermediate signals X* and Y* are written, to within phase error, in the form:

$$X^* = ai \cdot \cos(2\pi \cdot \Delta f \cdot t) \text{ and}$$

$$Y^* = bi \cdot \sin(2\pi \cdot \Delta f \cdot t),$$

$\Delta f$ is the frequency difference between the frequency generated by local oscillator 21 and the frequency of the modulation carriers.

Intermediate signals X* and Y* are then sampled at the transmission frequency of the sampling symbols 1/T to derive signals $X_n^E$ and $Y_n^E$ respectively at the outputs from the two converters 23a and 23b.

The digital signals $X_n^E$ and $Y_n^E$ at the outputs from the converters are phase shifted in digital phase shifter 24 with a demodulation phase $\phi_n$ derived by the phase loop digital processing circuit 26 as a function of discrete signals applied by output terminals BU and BD of the generalized phase comparing circuit 25.

Figure 4:
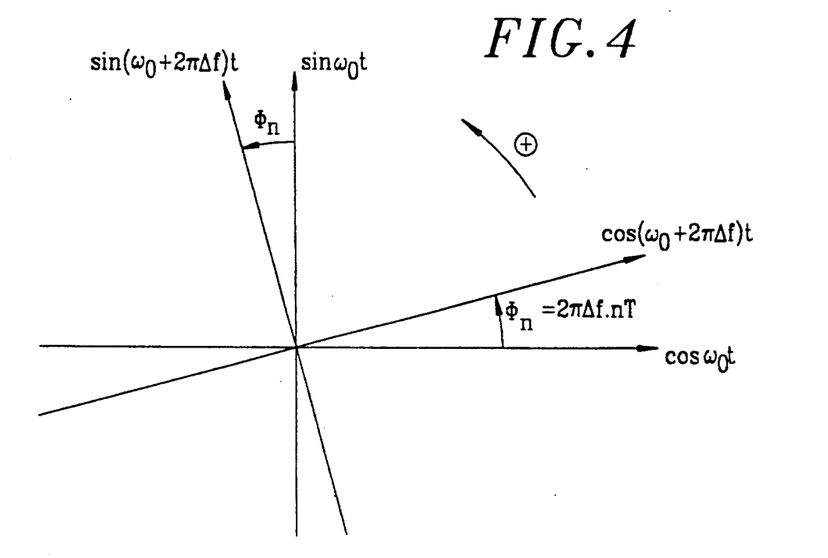
FIG. 4 is a Fresnel diagram to explain the principle of digital demodulation embodying the invention.

Intuitively, referring to FIG. 4 and designating by $(\cos(\omega_o + 2\pi \cdot \Delta f)t, \sin(\omega_o + 2\pi \cdot \Delta f)t)$ the two demodulation signals applied to the second inputs of mixers 11a and 11b, the two modulation carrier waves $(\cos\omega_o t;$ $sin\omega_0 t$) are deduced from the two demodulation signals applied to the two second inputs by a rotation of $\phi_n = 2\pi\Delta f \cdot nT$ at each sampling time $t = nT$. The role of phase shifter 24, circuit 25 and processing circuit 26 is precisely to derive, at each sampling time $t = nT$, the phase shift $\phi_n$ so as to a posteriori phase in the demodulation signals with respect to the modulation carriers to restore the values of the symbols transmitted from outputs SD1 and SD2 of digital phase shifter 24.

Figure 5:
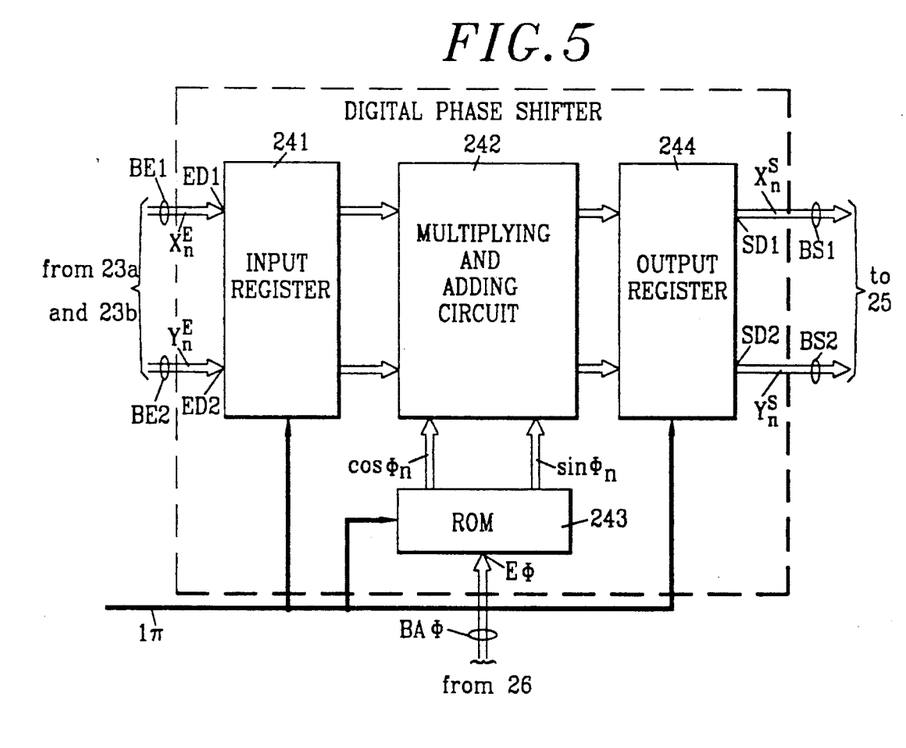
FIG. 5 is a block diagram of a digital phase shifter included in the coherent demodulating device embodying the invention.

Referring to FIG. 5, digital phase shifter 24 comprises an input register 241, a multiplying and adding circuit 242, a ROM memory 243 and an output register 244. Input and output registers 241 and 244 constitute buffer memories to respectively store temporarily at sampling or clock frequency 1/T the data received from the two analog/digital converters 23A and 23B and the data outgoing from the carrier recovering circuit to the comparing circuit 25. Thus input register 241 stores the couples of sampled input signals $X_n^E$ and $Y_n^E$ at frequency 1/T, and output register 244 stores the couples of sampled output signals $X_n^S$ and $Y_n^S$ of the demodulated signal.

The purpose of phase shifter 24 is to phase shift, by an angle $\phi_n$, input signals $X_n^E$ and $Y_n^E$ so as to derive the demodulated output signals $X_n^S$ and $Y_n^S$. FIG. 4 schematizes the operation of the phase shifter. The rotation relations are written at each time $t = nT$ as follows:

$$\begin{pmatrix} X_n^S \\ Y_n^S \end{pmatrix} = \begin{pmatrix} \cos\phi_n & -\sin\phi_n \\ \sin\phi_n & +\cos\phi_n \end{pmatrix} \begin{pmatrix} X_n^E \\ Y_n^E \end{pmatrix}$$

Complex circuit 242 receives the couple $(X_n^E, Y_n^E)$ from input register 242 and supplies the couple $(X_n^S, Y_n^S)$ to the output register 244 via internal buses of phase shifter 24. Circuit 242 which calculates the couple $(X_n^S, Y_n^S)$ thus contains four multipliers, an adder and a subtracter. Two buses outgoing from the ROM memory 243 apply the couple of trigonometrical functions $(\cos\phi_n, \sin\phi_n)$ to inputs of circuit 242. ROM memory 243 contains, in a discrete form, the $\cos\phi_n$ and $\sin\phi_n$ functions with $0 \geq \phi_n \geq 2\pi$. To read the couple $(\cos\phi_n, \sin\phi_n)$ in a cell of the memory, the phase loop digital processing circuit 26 supplies, through bus BA$\phi$, a read address so as to read in the two data buses the corresponding value of the phase shift angle $\phi_n$ of input signals $X_n^E$ and $Y_n^E$.

The transfer, calculation and read operations in registers 241 and 244, circuit 242 and memory 243 are timed at the sampling frequency 1/T generated by the rhythm recovering circuit 22.

It will be noted that the programming of ROM memory 243 in harmony with the phase loop digital processing circuit 26, basically depends on the adopted modulation (4-QAM, 16-QAM . . . ) and the loop stability required depending precisely on the adopted modulation. The demodulated digital signals $X_n^S$ and $Y_n^S$ outgoing from output register 244 are applied to a decoding circuit, not shown, so as to reconstitute the transmitted digital signal, and also to the inputs of comparing circuit 25 to establish the demodulation phase $\phi_n$ at time $t = nT$.

Figure 6:
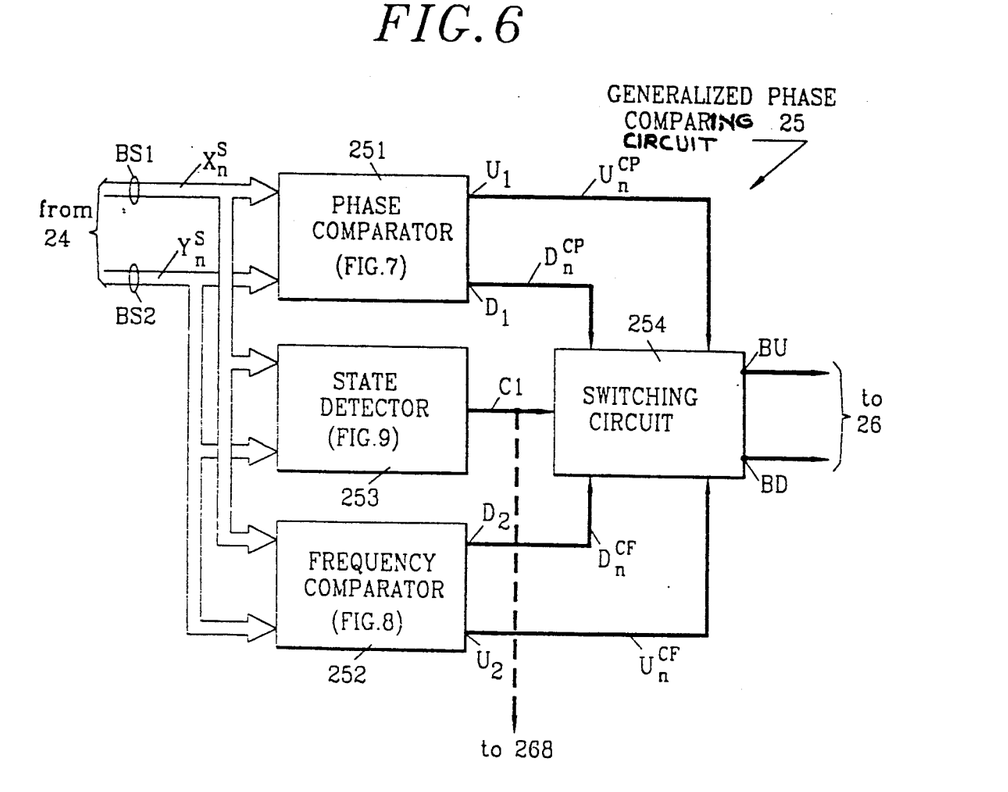
FIG. 6 is a block diagram of a generalized phase comparing circuit included in the coherent demodulating device embodying the invention.

The generalized phase comparing circuit 25, as shown in FIG. 6, comprises a phase comparator 251, a frequency comparator 252, a state detector 253 and a switching circuit 254. Both comparators 251 and 252 and the state detector 253 each receive at respective inputs the demodulated output signals $X_n^S$ and $Y_n^S$ at each time $t = nT$. Two outputs $U_1$ and $D_1$ of phase comparator 251 and two outputs $U_2$ and $D_2$ of frequency comparator 252 are selected in switching circuit 254 by a control signal C1 derived by state detector 253. The control signal C1 is respectively at logic level "1" to connect outputs $U_1$ and $D_1$ of phase comparator 251 to output terminals BU and BD of comparing circuit 25, and at logic level "0" to connect outputs $U_2$ and $D_2$ of frequency comparator 252 to terminals BU and BD. Phase comparator 251 is selected in phase tracking operation, i.e. frequency holding, to "fix" the demodulation phase $\phi_n$ on the modulation phase of the carrier. Frequency comparator 252 is selected in frequency acquisition operation to "fix" the demodulation frequency on the modulation carrier frequency, i.e., inhibit the frequency difference $\Delta f$ existing between the frequency of the reception local oscillator 21 and the modulation carrier frequency. The signals at outputs $U_1$, $D_1$, $U_2$ and $D_2$ of comparators 251 and 252, and the switching control signal C1 are in the form of pulses.

Figure 7:
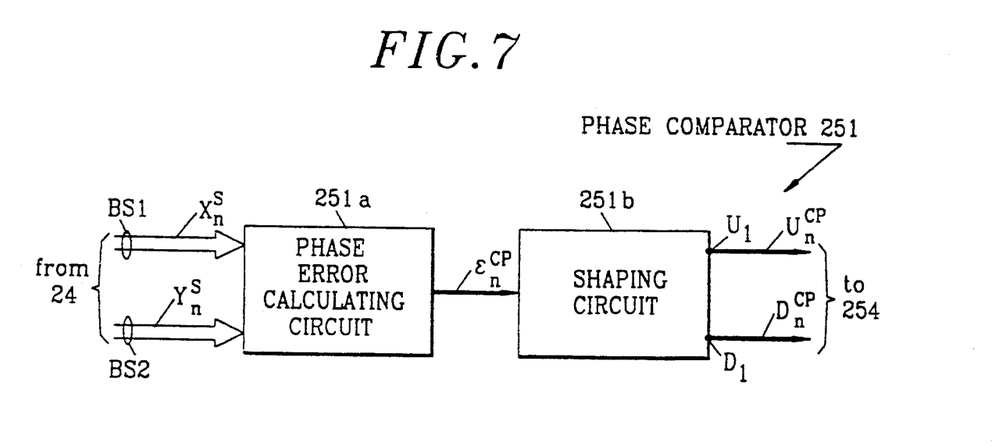
FIGS. 7, 8 and 9 are block diagrams of phase comparator, frequency comparator and state detector included in the generalized phase comparing circuit, respectively.
Figure 8:
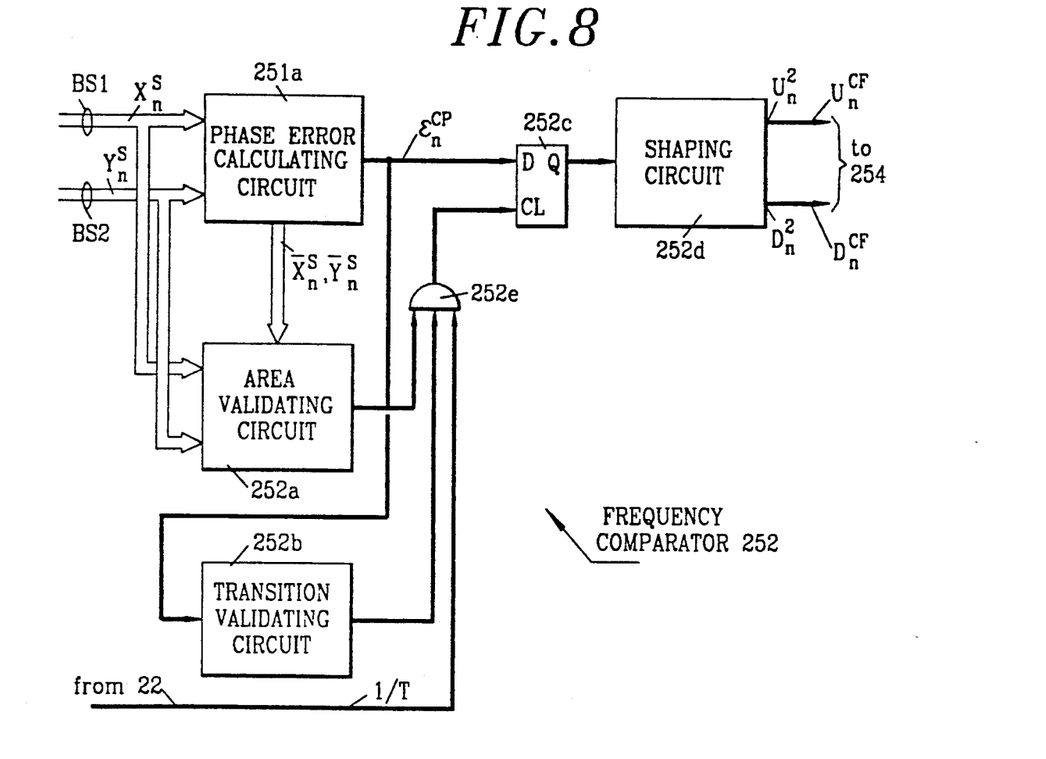
Figure 9:
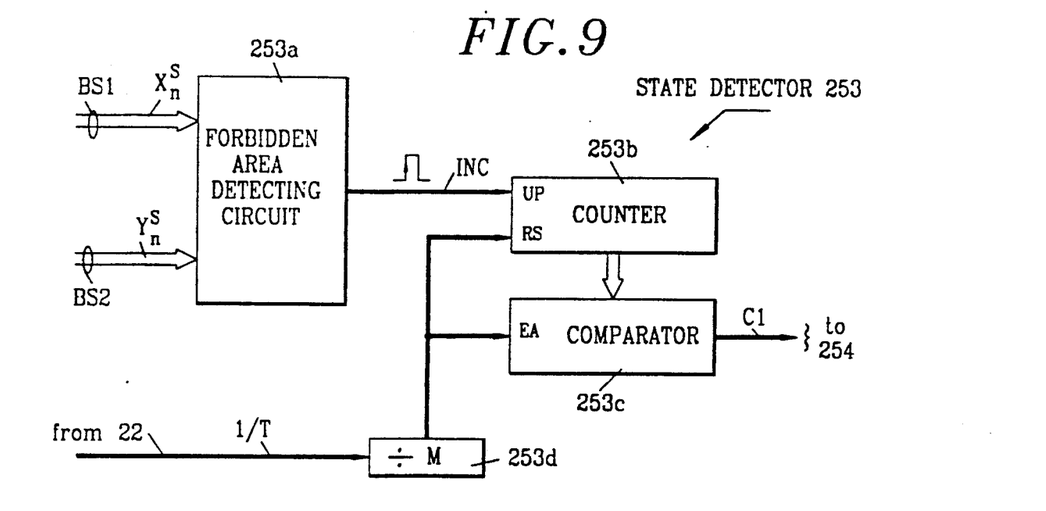

The operations of phase comparator 251, frequency comparator 252 and state detector 253 are now detailed by referring to FIGS. 7, 8 and 9.

As shown in FIG. 7, phase comparator 251 comprises a phase error calculating circuit 251a and a shaping circuit 251b.

The phase error calculating circuit 251a can be similar to the analog "signal processing means" illustrated in FIG. 7 of European Patent Application No. 71,514 corresponding to U.S. Pat. No. 4,484,337. According to this patent application, the signal processing means produce, for the two demodulation channels, respective analog signals $(X - \overline{X})$ and $(Y - \overline{Y})$ where X and Y denote the demodulated signals delivered by the mixers, and $\overline{X}$ and $\overline{Y}$ denote the two signals reconstructed from demodulated signals X and Y of the demodulated signal notably by discrimination in relation to predetermined thresholds depending on modulation type symbols. The processing means produce an error signal $\epsilon(\phi)$ of ternary type so as to control a voltage-controlled oscillator, such as oscillator 17 according to the prior art:

$$\epsilon(\phi) = sgn[sgn(X - \overline{X}) \cdot sgn(Y) - sgn(Y - \overline{Y}) \cdot sgn(X)]$$

in which sgn indicates the "sign" function.

According to the invention, the phase error calculating circuit 251a produces at each time $t = nT$ an error sample signal $\epsilon_n^{CP}$, which is similar to a sample of signal $\epsilon(\phi)$ and which is also of ternary type $(+, -, 0)$:

$$\epsilon_n^{CP} = sgn[sgn(\overline{X}_n^S - X_n^S) \cdot sgn(\overline{Y}_n^S) - sgn(Y_n^S - \overline{Y}_n^S) \cdot sgn(X_n^S)],$$

in which $\overline{X}_n^S$ and $\overline{Y}_n^S$ denote the reconstructed sample signals.

The signal $\epsilon_n^{CP}$ derived from circuit 251a is applied to the input of shaping circuit 251b. The shaping circuit comprises two threshold comparators whose outputs $U_1$ and $D_1$ deliver the $U_n^{CP}$ and $D_n^{CP}$ signals, one of which provides at time $t = nT$ a brief active pulse to state "1", respectively in response to ternary states "+" and "−" of error signal $\epsilon_n^{CP}$. None of the signals $U_n^{CP}$ and $D_n^{CP}$ contains an active pulse when the error signal $\epsilon_n^{CP}$ is equal to zero. The task of this error signal $\epsilon_n^{CP}$ shaping will be explained later when describing the phase loop digital processing circuit 26.

Referring to FIG. 8, frequency comparator 252 comprises the phase error calculating circuit 251a, an area validating circuit 252a, a transition validating circuit 252b, a D flip-flop 252c, a shaping circuit 252d and a three-input AND gate 252e. Although illustrated in FIGS. 7 and 8, circuit 251a is in practice common to the two comparators 251 and 252. Shaping circuit 252d is similar to circuit 251b already described in reference to FIG. 7.

The ternary error signal $\epsilon_n^{CP}$ produced by the phase error calculating circuit 251a is applied to input D of flip-flop 252c and is validated on output Q thereof only when certain conditions are met. For this purpose, the area validating circuit 252a receiving the demodulated sample signals $X_n^S$ and $Y_n^S$, via buses BS$_1$ and BS$_2$, the transition validating circuit 252b receiving the error signal $\epsilon_n^{CP}$, and the rhythm recovering circuit 22 have outputs connected respectively to the inputs of the AND gate 252e whose output is connected to the clock input CL of flip-flop 252c.

The principle of operation of frequency comparator 252 is substantially similar to that of demodulated signals processing means described in the French Patent Application No. 2, 552, 959 and consists in inhibiting the clock pulse 1/T applied to flip-flop 252c by the rhythm recovering circuit 22, via gate 252e, and hence maintaining the state of output Q of the flip-flop preceding each clock pulse under two conditions. These two conditions are established by the area validating circuit 252a and the transition validating circuit 252b.

The output of area validating circuit 252a is at low state "0" and the output of the phase error calculating circuit 251a is therefore not validated in D flip-flop 252c when:

$$|X_n^S - \overline{X_n^S}| > R, \text{ and } |Y_n^S - \overline{Y_n^S}| > R$$

in which R is a predetermined real number. In practice these relations mean that the error signal transitions have a low probability of being significant and should not be validated.

The output of transition validating circuit 252b is only to high state "1" when the error signal $\epsilon_n^{CP}$ derived from the phase error calculating circuit 251a is going from a low state "−" to a high state "+" or the reverse. The frequency difference between the local carrier waves and the modulation carrier waves is then different from zero. In practice, referring to FIG. 4, circuit 252b allows to keep the output of flip-flop 252c to a high state "+" when the difference between the demodulation carrier frequency ($\omega_o/2\pi + \Delta f$) and the modulation carrier frequency ($\omega_o/2\pi$) is positive, and at a low state "−" when the difference between the demodulation frequency and modulation frequency is negative.

According to French Patent Application No. 2, 552, 959 the phase comparator which is used is a comparator delivering a binary error signal. The phase error calculating circuit 251a according to the invention supplies a ternary type error signal $\epsilon_n^{CP}$. The second condition is a supplementary one which consists in producing a level "0" on the output of transition validating circuit 252b responsive to error signal transitions $\epsilon_n^{CP}$ to $\epsilon_{n+1}^{CP}$, between time t=nT and time t=(n+1)T, respectively from level "+" or "−" to level "0". The frequency acquisition ranges are then more extensive.

The principle of state detector 253 whose role is to control switching circuit 254 to selectively validate either the outputs of phase comparator 251, or the outputs of frequency comparator 252, is now described with reference to FIG. 9. State detector 253 detects the two states of the digital carrier wave recovery loop: a first state, called as "locked-on state", corresponds to a phase tracking (or frequency holding) operation, during which phase comparator 251 is selected; a second state, called as "break-off state", corresponds to the frequency acquisition operation during which frequency comparator 252 is selected. This detection is obtained by analyzing the location of the demodulated sample signal components $X_n^S$ and $Y_n^S$, that the state detector receives via buses BS$_1$ and BS$_2$, in the Fresnel diagram.

Figure 10:
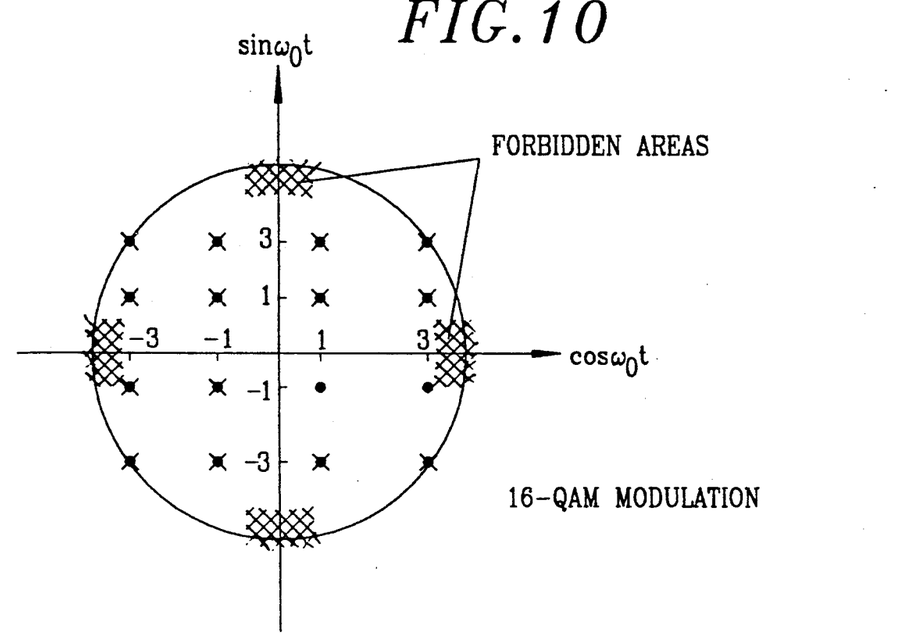
FIG. 10 is a Fresnel diagram showing a constellation of a 16-QAM modulation to explain the principle of operation of the state detector.

FIG. 10 shows, to provide an example, a Fresnel diagram also termed "constellation", relating to a 16-QAM modulation. The crosses "x" designate the different geometrical points of a vector associated to the symbols of modulated signal SI. Now referring to FIG. 4, it has been seen that the first demodulation stage, according to the invention, to produce an intermediate signal (X*, Y*) consists in "projecting" the modulated signal received by the $\cos(\omega_o + 2\pi\Delta f)t$, and $\sin(\omega_o + 2\pi\Delta f)t +]$ signals whose frequency differs by $\Delta f$ with respect to the frequency of the modulation carrier ($\omega_o/2\pi$). Returning to FIG. 10, for a frequency difference $\Delta f$, the vectors representing the signals $\cos(-\omega_o + 2\pi\Delta f)t, \sin(\omega_o + 2\pi\Delta f)t$ phase-shift continuously in relation to the axial vectors representing the modulation signals [cos $\omega_o$t, sin $\omega_o$t], and the "projections" produced to obtain the transmitted symbols can generate couples of symbols which do not exist in modulation 16-QAM. "Forbidden areas" containing no symbols or modulated signal states are defined judiciously in the Fresnel diagram. The position, form and size of the forbidden areas are pre-programmed in circuit 253a and depend on the characteristics of the modulations. An example of forbidden areas is indicated in the hashured areas located on the axes of the diagram in FIG. 10.

Referring to FIG. 9, the state detector comprises forbidden area detecting circuit 253a, a counter 253b, a threshold digital comparator 253c and a frequency divider 253d. Forbidden area detecting circuit 253a receives at two inputs the two demodulated signal components $X_n^S$ and $Y_n^S$ and produces incrementation pulses INC applied to an incrementation input UP of counter 253b when said demodulated signal components belong to forbidden areas. This expresses the fact that the amplitudes of the demodulated signal components ($X_n^S, Y_n^S$), belong to predetermined respective amplitude interval couples. Frequency divider 253d receives the sampling signal with period T from rhythm recovering circuit 22 to produce a signal with period MT. This signal with period MT is applied to a reset input RS of counter 253b and an activation input EA of comparator 253c. At the end of each period MT, counter 253b applies the incrementation pulse count to an input of comparator 253c, then is reset. Comparator 253c compares the incrementation pulse count to a first predetermined threshold at each end of period MT. The output of comparator 253c supplies control signal C1 to the switching circuit 254.

When forbidden area detecting circuit 253a detects in the demodulated signal ($X_n^S, Y_n^S$), symbols belonging to the forbidden areas, an incrementation pulse INC providing a transition to a high level "1" increments counter 253b by one unity. Cyclically at frequency 1/(MT) defined by frequency divider 253d, the count of counter 253b is compared to a first digital threshold stored in comparator 253c. If the count of the counter is greater than said first digital threshold, control signal C1 goes to logic state "1" to connect outputs $U_2$ and $D_2$ of frequency comparator 252 to terminals BU and BD through switching circuit 254. If the count of counter 253b is less than said first digital threshold, control signal C1 is to state "0" to connect outputs $U_1$ and $D_1$ of phase comparator 251 to terminals BU and BD through switching circuit 254. Referring to FIG. 4, the fact that the count of counter 253c is greater than the first predetermined digital threshold expresses that the frequency difference Δf is too high and an acquisition step should be triggered and hence that the outputs of frequency comparator 252 should be enabled.

Figure 11:
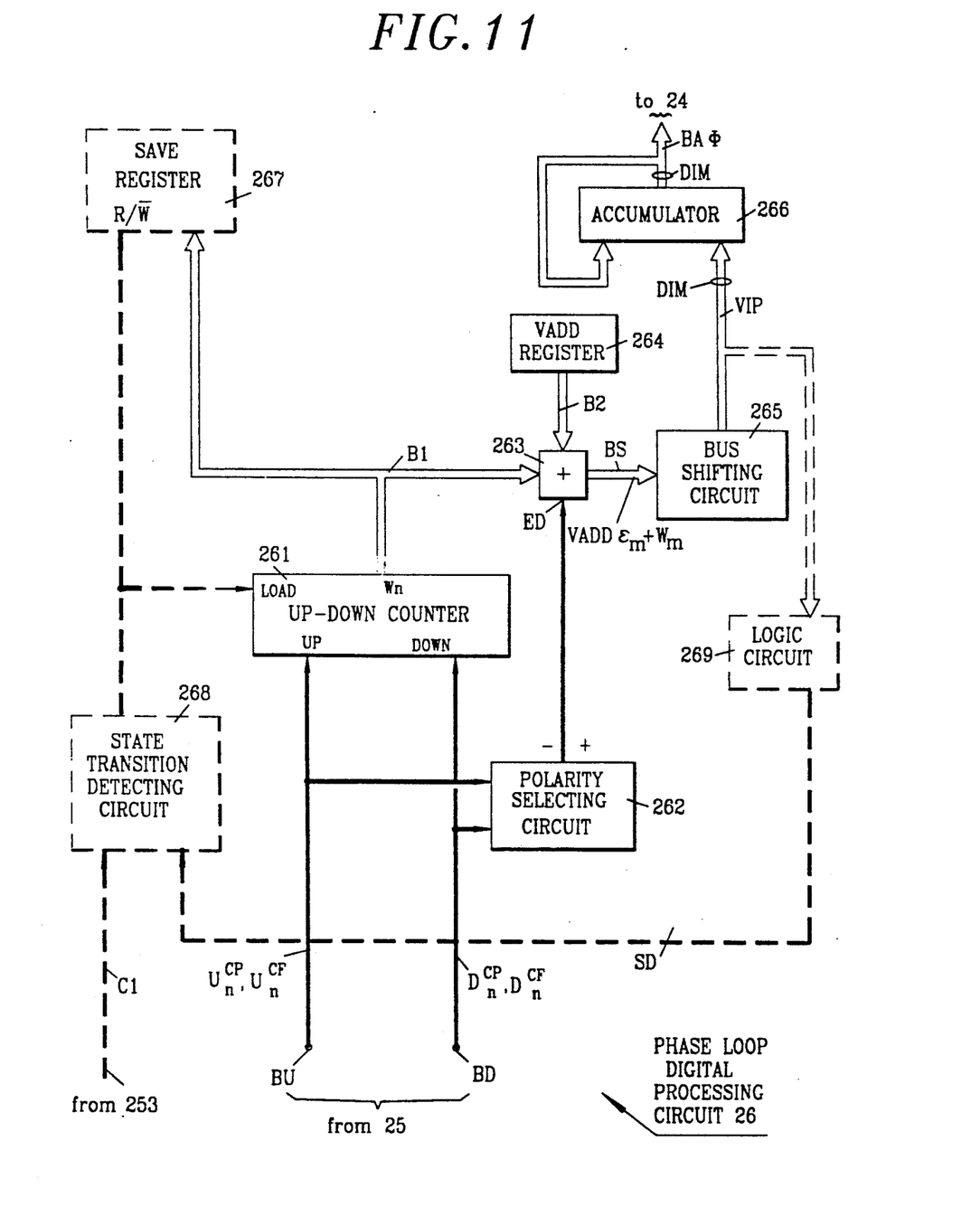
FIG. 11 is a block diagram of a phase loop digital processing circuit included in the coherent demodulating device embodying the invention.

The role of digital processing circuit 26 is to "simulate" a phase loop whose discrete operating equation is equation (2b) already indicated. In other words, circuit 26 filters the error signal characteristics to terminals BU and BD of the generalized phase comparing circuit 25 to produce the demodulation phase $\phi_n$ and thus play a similar role to loop filter 15 and oscillator VCO 17 according to the prior art.

According to the embodiment illustrated in FIG. 11, digital processing circuit 26 comprises an up-down counter 261, a polarity selecting circuit 262, a digital adder 263, a increment register 264, a bus shifting circuit 265, and an accumulator 266. Output terminals BU and BD of switching circuit 254 apply at each time t=nT, either signals $U_n^{CP}$ and $D_n^{CP}$ outgoing from phase comparator 251, or signals $U_n^{CP}$ and $D_n^{CP}$ outgoing from frequency comparator 252, respectively to a UP counting control input and to a DOWN down-counting control input of up-down counter 261. Data outputs of up-down counter 261 and first inputs of adder 263 are connected by means of a two-way bus B1. Second data inputs of adder 263 are connected to outputs of increment register 264 by a bus B2. Adder 263 applies the results of an addition or subtraction to the bus shifting circuit 265 via an output bus BS. Outputs of the bus shifting circuit are connected to first inputs of accumulator 266 whose outputs form bus address BA$\phi$ to address ROM memory 243 in digital phase shifter 24 and are looped back on second inputs of the accumulator.

From equation (2b) demodulation phase $\phi_{m+1}$ at time t=(m+1)T is deduced from demodulation phase $\phi_m$ at time t=mT added to a phase incrementation value VIP provided by the equation:

$$VIP = MUL\ (ADD \cdot \epsilon_m + W_m)$$

in which $\epsilon_m$ denotes the error signal at time t=mT, and $W_m = W_{m-1} + \epsilon_{m-1}$ is an intermediate variable.

Thus for a given intermediate variable value $W_m$, at time t=mT the phase incrementation value VIP is deduced by adding to this value $W_m$ the value ADD, −ADD or "0" given that error signal $\epsilon_m$ is equal to "1", "−1" or "0", then by multiplying the value of the result of the previous operation by MUL.

The signals outgoing from generalized phase comparing circuit 25 and applied respectively to the UP counting input and DOWN down-counting input of up-down counter 261 increment and decrement the content of up-down counter 261 so that the latter is equal at each sampling time to the intermediate variable $W_m$ in accordance with the above equation in which $\epsilon_{m-1}$ is an error signal whose possible values belong to the set {−1, 0, 1}. Up-down counter 261 thus provides a first integration of the intermediate signal similar to that of loop filter 16. The addition or the subtraction of the value ADD·$\epsilon_m$ at this intermediate value consists in adding or subtracting the value ADD, or else performing no operation given that the ternary discrete error signal $\epsilon_m$ has values +1, or 1, or else 0. The addition or the subtraction is obtained by increment register 264, adder 263 and polarity selecting circuit 262. For this purpose register 264 stores a binary value VADD substantially equal to ADD provided by:

$$VADD = INT(ADD) = INT\left(\frac{\xi^2 + 1/4}{B_L \cdot T}\right)$$

in which INT designates the integer part function.

Polarity selecting circuit 262 possesses two inputs connected to output terminals BU and BD of the generalized phase comparing circuit, and an output connected to a decision input ED of adder 263. Circuit 262 applies to decision input ED a signal representing the operation, addition or subtraction, to be carried out by adder 263. The operation consists in an addition in response to signal $D_n^{CP}$ or $D_n^{CF}$ transmitted by terminal BU of comparing circuit 25, and consists in a subtraction in response to signal $U_n^{CP}$ or $U_n^{CF}$ transmitted by terminal BD of phase comparing circuit 25. No addition or subtraction is made in the absence of pulse signals $U_n^{CP}$, $D_n^{CP}$, $U_n^{CF}$ and $D_n^{CF}$, i.e., when the discrete error signal $\epsilon_m$ is equal to 0. Thus the value (VADD) is respectively added to or subtracted from the content of up-down counter 261 depending on the polarity chosen by circuit 262.

Multiplication by multiplier coefficient MUL to obtain phase incrementation VIP is provided by bus shifting circuit 265. Let DIM be the dimension of addressing bus BA$\phi$, i.e., the number of bits of a read address word addressing ROM memory 243 in digital phase shifter 24. Bus BA$\phi$ carries binary words which are representative of demodulation phases comprised in interval [0, 2π] so as to cover the whole of the possible phase incrementations to establish the demodulation phase at each time t=mT. Each address word in bus BA$\phi$ addresses trigonometrical discrete values [cos $\phi_m$, sin $\phi_m$] stored in memory 243 for discrete values of $\phi_m$ belonging to interval [0,2π]. Thus an address word at DIM bits is such that the least significant binary element represents an elementary phase increment $$\phi = \frac{2\pi}{2^{DI}}.$$

In order to "normalize" the phase incrementation in relation to multiplier coefficient MUL, which is equivalent to dividing VIP by MUL and thus shifting the most significant bits of word VIP to the right or left depending on the sign of VIP, the word VIP should then be shifted in function not only of VADD but also $2^{DIM}$, i.e., a bus shift which is the nearest integer value of the ratio:

$$2\pi/(2^{DIM-1} \cdot MUL).$$

From this it is therefore deduced that the bus shift DEB is defined by the equation:

$$DEB = INT(Log_2\ (\pi/(2^{DIM-a} \cdot MUL))),$$

in which INT designates the "integer part" function. The phase incrementation value VIP outgoing from bus shifting circuit 265 is thus obtained at each sampling time t=nT.

The demodulation phase $\phi_{m+1}$ at time t=(m+1) T is obtained by adding the phase incrementation value VIP to the demodulation phase $\phi_m$ at time t=mT in accumulator 266. This latter receives at first inputs the normalized phase incrementation value VIP and delivers an address of discrete trigonometrical value pair [cos $\phi_m$, sin $\phi_m$]. Bus BA$\phi$ carrying the address is looped back on second inputs of accumulator 266. The least significant bits in the sum obtained are truncated so that the addresses have a constant number of bits. The accumulator thus makes a second integration of the error signal, similar to that done in analog oscillator VCO 17.

It has been shown how a phase loop is "digitally inserted", by taking into account of its discrete operating equation and hence its embodiment in the shape of a digital circuit. Analogies between this digital circuit and a conventional analog phase loop are described below. As already stated, the digital addition of error sample signals carried out by up-down counter 261 is the image of analog integration obtained by phase loop filter 16 in FIG. 1 ($1/\tau_1 p$); likewise the digital incrementation obtained by accumulator 266 is the image of the analog integration obtained by voltage-controlled oscillator 17 ($K_o/p$).

Referring to FIGS. 6 and circuits and connections shown in shorted dotted lines have deliberately not been described until now. These circuits and connections consist of frequency acquisition procedure managing means.

Referring to FIG. 11, acquisition procedure managing means comprise a save register 267, a state transition detecting circuit 268, and a logic circuit 269. An input/output port of the save register is connected to bus B1. Inputs of logic circuit 269 are connected to the output bus of bus shifting circuit 265. An output of logic circuit 269 and the control signal output C1 of state detector 253 are connected to inputs of the state transition detecting circuit 268. The output of circuit 268 supplies a load input LOAD of up-down counter 261 and a Read/Write input R/W of save register 267.

Figure 12:
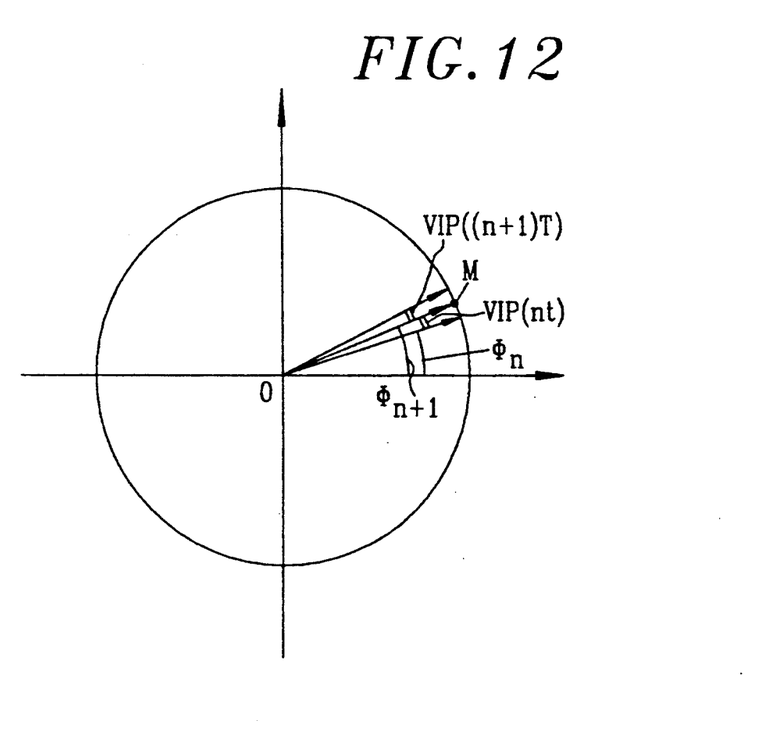
FIG. 12 is a Fresnel diagram to explain the principle of operation of the phase loop digital processing circuit.

Referring to FIG. 12, the deriving of modulation phase $\phi_{n+1}$ by digital processing circuit 26 at time t=(n+1)T is deduced from demodulation phase $\phi_n$ at time t=nT by adding the phase incrementation value VIP at time t=(n+1)T. Thus for a given fixed frequency difference $\Delta f$ between the frequency of the local oscillator 21 and the frequency of the quadrature carrier waves, the content of up-down counter 261 is representative of said frequency difference $\Delta f$ when the loop is locked on. The up-down counter in fact stores the phase incrementation value to within the sum and produce parameters ADD and MUL as seen previously. In most applications this frequency difference $\Delta f$ varies very slowly in time and can therefore be considered as fixed during the average time required to resynchronize the loop subsequent to a break-off.

Save register 267 is precisely used to reset the content of the up-down counter at the start of a frequency acquisition phase. To do so, register 267 periodically saves the content of up-down counter 261 when the loop is locked on. When a break-off is detected by state detector 253, the latter applied the state transition control signal C1 with logic level "1" to enable the outputs of frequency comparator 252. Signal C1 is also applied to the input of state transition detecting circuit 268 whose output goes from a low state "0" to a high state "1" thus resetting the content of up-down counter 261 with respect to the content of save register 267. Thus the acquisition phase starts in a vicinity close to the required frequency difference $\Delta f$, thus implying considerably shorter acquisition times.

Causes for disturbance, such as frequency shifts and noises, having implied undesirable break-offs of the loop should not be taken into account during the acquisition phases coming after said undesirable break-offs. Logic circuit 269 is precisely designed to limit the permitted frequency difference $\Delta f$ around the frequency of the signal generated by local oscillator 21. For this purpose logic circuit 269 receives through the output bus of bus shifting circuit 265 a normalized phase incrementation value and sets its output to high state "1" when this normalized value is greater than a second predetermined threshold value. A corresponding overrange signal SD is applied from the output of logic circuit 269 to the input of state transition detecting circuit 268 which then controls a reset of the content of up-down counter 261 so as to re-trigger a frequency acquisition procedure.

What we claim is:

1. A coherent demodulating device in a receiver receiving a modulated signal obtained by multi-symbol modulation of two quadrature modulation carrier waves, said coherent demodulating device comprising demodulating means supplying quadrature demodulation carrier waves for demodulating said modulated signal into two demodulated analog component signals, said quadrature demodulation carrier waves having a frequency belonging to a frequential uncertainty range of said modulation carrier waves, sampling means operating at a symbol clock frequency of said modulated signal for converting said two demodulated analog component signals into two incoming digital signals forming coupled of samples, digital phase shifting means for phase shifting said two incoming signals by a digital demodulation phase into two outgoing digital signals, digital phase comparing means for receiving said two outgoing digital signals and for producing, at said symbol clock frequency, first and second error signal pulses, respectively, corresponding to negative and positive phase differences between said demodulation carrier waves and said modulation carrier waves, digital frequency comparing means receiving said two outgoing digital signals for producing, at said symbol clock frequency, third and fourth error signal pulses, respectively, corresponding to positive and negative frequency differences between said demodulation carrier waves and said modulation carrier waves, state detecting means for supplying detection pulses responsive t amplitudes of said outgoing digital signals lying in respective predetermined amplitude intervals during each period of said symbol clock frequency, thereby deriving a logic control signal, switching means responsive to said logic control signal for activating said frequency comparing means and deactivating said phase comparing means when a count of said detection pulses cumulated during a period multiple of said symbol clock period is greater than a first predetermined threshold, and for deactivating said frequency comparing means and activating said phase comparing means when said count of said detection pulses cumulated during said multiple period is less than said first threshold, and digital processing means for calculating said digital demodulation phase as a function of said error signal pulses produced by one of said digital phase comparing means and digital frequency comparing means which is activated, so as to a posteriori compensate for phase and frequency differences between said modulation carrier waves and said demodulation carrier waves by phase shifting said two incoming signals.

2. The coherent demodulating device of claim 1, wherein said digital phase shifting means comprises a memory for storing digital values of two quadrature sinewave functions for several discrete values which can be taken by said digital demodulation phase, and digital multiplying means clocked at said symbol clock frequency for multiplying each one of said couples of samples of said two incoming digital signals by a rotation matrix formed from two of said digital values of said two quadrature sinewave functions which are read in said memory at a read address representative of said digital demodulation phase calculated by said digital processing means, thereby supplying a couple of samples of said outgoing digital signals.

3. The coherent demodulating device of claim 1, wherein said state detecting means comprises:

a circuit for producing one of said detection pulses when said amplitudes of said outgoing signals lie in said respective predetermined intervals during said clock period, a counter for counting said detection pulses during said multiple period into a cumulated detection pulse count, and a comparator for comparing said cumulated detection pulse count in said counter with said first threshold, thereby deriving said logic control signal whose two states, respectively, represent detection pulse counts greater than and less than said first threshold, whereby said switching means selectively switches said error signal pulses outgoing from said digital phase comparing means and said digital frequency comparing means to inputs of said digital processing means.

4. The coherent demodulating device of claim 3, wherein said digital processing means comprises:

an up-down counter having an incrementable and decrementable content, said content being incremented and decremented respectively by said first and second error signal pulses produced by said digital phase comparing means when said detection pulse count cumulated in said counter during said multiple period is less than said first threshold, and said content being also incremented and decremented respectively by said third and fourth error signal pulses produced by said digital frequency comparing means when said detection pulse count cumulated in said counter during said multiple period is greater than said first threshold, adding/subtracting means for respectively adding said content of said up-down counter to a first predetermined parameter in response to one of said first and third pulses and for subtracting said content of said up-down counter from said first parameter in response to one of said second and fourth pulses thereby providing an addition-subtraction result, means for multiplying said addition-subtraction result by a second predetermined parameter into a product, and means for accumulating said product at said symbol clock frequency thereby supplying said demodulation phase.

5. A coherent demodulating device as claimed in claim 4, comprising means for periodically saving the content of said up-down counter when said detection pulse count cumulated in said counter during said multiple period is less than said first threshold into a saved content, and means for introducing said saved content into said up-down counter when said cumulative detection pulse count cumulated in said counter during said multiple period is greater than said first threshold.

6. The coherent demodulating device of claim 5, wherein said content of said up-down counter is reset to zero when said product supplied by said multiplying means exceeds a second threshold.

* * * * *